(12) United States Patent
Rutherford et al.

(10) Patent No.: US 7,934,013 B2
(45) Date of Patent: *Apr. 26, 2011

(54) SYNCHRONOUS RATE ADAPTER

(75) Inventors: Franklin E. Rutherford, Santa Ana, CA (US); Joanne C. Wu, Irvine, CA (US)

(73) Assignee: QUALCOMM Incorporated, San Diego, CA (US)

( * ) Notice: Subject to any disclaimer, the term of this patent is extended or adjusted under 35 U.S.C. 154(b) by 99 days.

This patent is subject to a terminal disclaimer.

(21) Appl. No.: 12/317,296

(22) Filed: Dec. 22, 2008

(65) Prior Publication Data

US 2009/0119411 A1    May 7, 2009

Related U.S. Application Data (63) Continuation of application No. 10/401,474, filed on Mar. 28, 2003, now Pat. No. 7,472,199.

(51) Int. Cl.
 *G06F 15/16* (2006.01)
(52) U.S. Cl. ........ 709/233; 709/232; 709/234; 709/235; 709/246; 370/235; 370/505; 375/372
(58) Field of Classification Search .......... 709/232–235; 370/235, 505; 375/372
See application file for complete search history.

(56) References Cited

U.S. PATENT DOCUMENTS

| | | | | |
|---|---|---|---|---|
| 3,742,145 A * | 6/1973 | Clark et al. | ...... | 370/505 |
| 5,796,690 A | 8/1998 | Kanno | ...... | 369/47.18 |
| 5,822,327 A * | 10/1998 | Satou | ...... | 370/505 |
| 5,892,980 A | 4/1999 | Tal et al. | ...... | 710/565 |
| 5,913,039 A | 6/1999 | Nakamura et al. | ...... | 709/231 |
| 5,940,738 A | 8/1999 | Rao | ...... | 725/103 |
| 5,953,336 A | 9/1999 | Moore et al. | ...... | 370/395.43 |
| 5,983,278 A | 11/1999 | Chong et al. | ...... | 790/235 |
| 6,401,149 B1 | 6/2002 | Dennin et al. | ...... | 710/58 |
| 6,466,562 B1 | 10/2002 | Yoshida et al. | ...... | 370/336 |
| 6,542,518 B1 | 4/2003 | Miyazawa | ...... | 370/468 |
| 6,594,826 B1 | 7/2003 | Rao et al. | ...... | 725/95 |
| 6,687,860 B1 | 2/2004 | Iijima et al. | ...... | 714/718 |
| 6,738,347 B1 | 5/2004 | Mio et al. | ...... | 370/230 |
| 6,865,232 B1 | 3/2005 | Isaksson et al. | ...... | 375/260 |
| 7,046,746 B1 * | 5/2006 | Keaney et al. | ...... | 375/341 |
| 7,260,099 B1 | 8/2007 | Brown et al. | ...... | 370/395.51 |
| 2001/0040872 A1 | 11/2001 | Haglund | ...... | 370/235 |
| 2002/0004881 A1 | 1/2002 | Lijima et al. | ...... | 711/105 |
| 2002/0069375 A1 | 6/2002 | Bowen | ...... | 713/400 |
| 2002/0101923 A1 | 8/2002 | Segawa et al. | ...... | 375/240.02 |
| 2003/0037190 A1 | 2/2003 | Alexander et al. | ...... | 710/52 |
| 2003/0067655 A1 | 4/2003 | Pedersen et al. | ...... | 359/152 |
| 2003/0229875 A1 | 12/2003 | Smith et al. | ...... | 716/10 |

* cited by examiner

*Primary Examiner* — Alina N. Boutah (57) ABSTRACT

Systems and methods for transporting client data received at a first rate over an interconnect at a second, higher rate, wherein the client data is combined with dummy data according to a pattern that minimizes the amount of buffer space required to store the received client data. In one embodiment, a method comprises receiving client data at the first rate, buffering the client data, retrieving the client data, combining the client data with dummy data according to the pattern, and transmitting the combined data at the second rate. The pattern comprises K blocks, of which a first number contain P w-bytes of client data, and of which the remainder contain P+1 w-bytes of client data. The remainder of the space in the blocks is stuffed with dummy data. The pattern may also include a residual slot that contains one or more bytes of client data.

16 Claims, 6 Drawing Sheets

SYNCHRONOUS RATE ADAPTER

PRIORITY

This is a continuation of U.S. patent application Ser. No. 10/401,474, filed Mar. 28, 2003, which will issue as U.S. Pat. No. 7,472,199 on Dec. 30, 2008.

BACKGROUND OF THE INVENTION

The invention relates generally to data communications, and more particularly to systems and methods for transporting client data received at a first rate over an interconnect at a second, higher rate, wherein the client data is combined with dummy data according to a pattern that minimizes the amount of buffer space required to store the received client data.

With the increasing use of computers by businesses, governmental entities and individuals, increasing amounts of data are being used. This information is being used not only by the particular entities that create it, but also by other entities that interact with the originators of the data. There is therefore an increased need to transport the data from one entity to another.

Computers may be coupled together by any different types of interconnecting media. For example, they may be coupled together by direct interconnections or, more commonly, they may be coupled to networks that allow them to communicate with each other. One of the most well-known networks is the Internet. Millions, if not billions of computers are connected to the Internet and are capable of communicating with each other. These computers transport vast amounts of data over the many individual networks that comprise the Internet.

While the mechanics of the individual networks are not apparent to most users, myriad technical issues must be resolved in designing a network system that is capable of allowing different computers to be connected to it, or that is capable issues is related to the transport of data that is supplied to the network at a first frequency, when the network itself is designed to transport data at a different frequency.

One mechanism for handling this problem is to buffer the received data and to periodically retrieve the data from the buffer so that it can be transported over the network. Typically, the buffer provided for this purpose is quite large. This allows large amounts of data to be accumulated while the data awaits transport. Having a large amount of data in the buffer may minimize the control that is necessary to avoid buffer underflow. This mechanism may not be suitable in some implementations, however, because the time the data spends in the buffer adds to the latency of its delivery. Further, in some implementations, it may not be practical or desirable to provide a large amount of buffer space for this purpose.

It may therefore be desirable to provide a mechanism for enabling the transport of data at a higher rate than the data is received, while at the same time minimizing the amount of buffer space that is required to store the data.

SUMMARY OF THE INVENTION

One or more of the problems outlined above may be solved by the various embodiments of the invention. Broadly speaking, the invention comprises systems and methods for transporting client data received at a first rate over an interconnect at a second, higher rate, wherein the client data is combined with dummy data according to a pattern that minimizes the amount of buffer space required to store the received client data.

One embodiment comprises a method including the steps of receiving client data at a first rate, buffering the client data, retrieving the client data, combining the client data with dummy data, and transmitting the combined data at a second rate, wherein the client data is transmitted according to a repeating pattern. The pattern comprises K successive blocks, of which a first number, R, of the K blocks contain a first amount of client data and a second number, K-R, of the K blocks contain a second amount of client data. The remainder of the space in the blocks is stuffed with dummy data. The pattern may also include a residual slot that contains one or more bytes of client data.

In this embodiment, the R blocks contain an amount, P+1, of client data, where P is the number of w-bytes of client data and w is the width (in bytes) of the interconnect over which the combined client and dummy data will be transported. The K-R blocks contain P w-bytes of client data. P is computed by determining a size of a payload, L, of a unit under operation and an amount of client data, N, to be mapped into the payload of the unit under operation, then determining the number, M, of full w-bytes of client data in N. (with is the width of the interconnect, in bytes.) P is equal to M divided by K, rounded down. R is the remainder of M divided by K. If N is not evenly divisible by w, r is equal to the remainder of N divided by w.

Another embodiment of the invention comprises a system having a FIFO (a first-in-first-out buffer) and a rate adaptation control unit coupled to the FIFO. The FIFO is configured to receive client data at a first data rate. The rate adaptation control unit is configured to retrieve client data from the first FIFO and combine the client data with dummy data according to a repeating pattern. The pattern comprises K successive blocks, wherein a first number, R, of the K blocks contain a first amount of client data, wherein a second number, K-R, of the K blocks contain a second amount of client data. The parameters of the pattern are computed as described above. The remainder of the space in the blocks is stuffed with dummy data. This may be achieved by providing the client data in the FIFO as an input to a multiplexer and controlling the multiplexer according to the pattern to alternately select either the client data or dummy data. The output of the multiplexer comprises the combined client and dummy data. The rate adaptation control unit then transports the combined data over a transport medium at a second data rate which is higher than the first data rate.

Another embodiment of the invention comprises a software program. The software application is embodied in a computer-readable medium such as a floppy disk, CD-ROM, DVD-ROM, RAM, ROM, or the like. The computer readable medium contains instructions which are configured to cause a computer or other data processor to execute a method which is generally as described above. The software application may, in one instance, implement the computation of the pattern described above. In another instance, the software application may implement the method for buffering the client data and combining it with the dummy data according to the computed pattern. It should be noted that the computer readable medium may comprise a RAM or other memory which forms part of a computer system. The computer system would thereby be enabled to perform a method in accordance with the present disclosure and is believed to be within the scope of the appended claims.

Numerous additional embodiments are also possible.

BRIEF DESCRIPTION OF THE DRAWINGS

Other objects and advantages of the invention may become apparent upon reading the following detailed description and upon reference to the accompanying drawings.

While the invention is subject to various modifications and alternative forms, specific embodiments thereof are shown by way of example in the drawings and the accompanying detailed description. It should be understood; however, that the drawings and detailed description are not intended to limit the invention to the particular embodiments which are described. This disclosure is instead intended to cover all modifications, equivalents and alternatives falling within the scope of the present invention as defined by the appended claims.

DETAILED DESCRIPTION OF PREFERRED EMBODIMENTS

One or more embodiments of the invention are described below. It should be noted that these and any other embodiments described below are exemplary and are intended to be illustrative of the invention rather than limiting.

As described herein, various embodiments of the invention comprise systems and methods for transporting client data received at a first rate over an interconnect at a second, higher rate, wherein the client data is combined with dummy data according to a pattern that minimizes the amount of buffer space required to store the received client data.

One embodiment of the invention comprises a method for transporting client data over a network, wherein the client data is received at a first rate and the network operates at a second, higher rate. The method is designed to minimize the amount of buffer space that is needed to buffer the received client data before it is retrieved and transported over the network.

In this embodiment, a pattern for packaging the data is determined, based upon the client data rate, the network data rate, and several other factors. The pattern can be characterized by a small set of parameters. These parameters can be communicated to both a transmitter and receiver at the ends of a network transmission path, where they can be used in the transmission of the client data.

At the transmitting end of the network transmission path, the client data, along with a predetermined amount of dummy data, is packed into a unit under operation (one or more transport units) according to the predetermined pattern. As noted above, this pattern is characterized by the parameters that are provided to the transmitter. The unit under operation is transported (in the form of the one or more transport units) and, when received by the receiver, the client data is unpacked according to the predetermined pattern. As the client data is unpacked, it is buffered and transmitted at the client data rate.

In accordance with one embodiment, the pattern consists of a plurality of blocks and a residual slot. A first portion of the blocks contain a first amount of data, the remainder of the blocks contain a second, slightly smaller amount of data, and the residual slot contains one or more residual bytes of data. The amounts of data contained in the blocks vary by one times the width of the network data path (i.e., the blocks contain either P or P+1 times the data width). The pattern can therefore be defined by the parameters K, P, R and r, where K is the total number of blocks in the pattern, P is the amount of data in the less-filled blocks (P+1 is the amount of data in the more-filled blocks), R is the number of more-filled blocks, and r is the number of bytes in the residual slot.

As explained above, when data which is received from a client at a first data rate is to be transmitted at a second, higher data rate, the data is initially stored in a buffer. The data is written to the buffer at the first data rate and read out of the buffer at the second data rate. Various embodiments of the present invention can minimize the amount of buffer space required to store the data.

The amount of required buffer space can be minimized because, in accordance with the embodiments disclosed herein, a certain amount of payload space which is available for transmission of client data over a transport medium is divided into blocks which will be at least partially filled with client data. Because the client data is distributed among these blocks, a buffer that is large enough to store one of these blocks is also large enough to store all of the client data that is contained in one of the blocks. The client data is therefore broken down into chunks that are known to be small enough to fit within the buffer. More specifically, the blocks are no more than $(P+1) \times w$ bytes in size. By handling the client data in these chunks of a known maximum size, buffer space is not unnecessarily allocated to this function.

For the purposes of the following description, it may be useful to define the following terms:

| | |
|---|---|
| $f_1$: | client data rate; |
| $f_2$: | transport medium data rate; |
| TU: | size of transport unit, packet or frame; |
| OPU: | size of payload of transport unit, packet or frame; |
| n: | number of transport units, packets or frames treated as a single unit under operation; |
| S: | size of unit under operation (in bytes; $S = n \times TU$); |
| L: | size of aggregated payload of unit under operation (in bytes; $L = n \times OPU$); |
| N: | size of client data to be mapped into each unit under operation (in bytes; $N = S \times f_1/f_2$); |
| w: | width of transport medium (in bytes); |
| r: | number of residual bytes (r = remainder of N/w); |
| M: | number of full w-bytes of client data (M = N/w, rounded down); |
| K: | number of blocks per unit under operation; |
| C: | capacity of block (in w-bytes); |
| J: | capacity of residual slot (in bytes); |
| P: | minimum number of w-bytes of client data in each block (P = M/K, rounded down; P + 1 is maximum); |
| R: | number of blocks having P + 1 w-bytes of client data (R = remainder of M/K). |

The present systems and methods address issues relating to the transport of client data which is received at a first rate, $f_1$, at a second, higher rate, $f_2$. These systems and methods also address the conversion of the data from the higher rate, $f_2$, back to the initial rate, $f_1$.

The data transported at the higher rate, $f_2$, may be referred to herein as interconnect data because the higher data rate is used to transport the data over an interconnect of some sort (i.e., the transport medium). This interconnect may be a point-to-point interconnect, a network interconnect, or any other type of interconnect, and is not intended to imply any limitation on the transport medium over which the data is transported at the higher rate.

Over a certain period of time, Δt, a first amount of client data, N, is received for transport. N is the number of bytes of client data. (It should be noted that, unless otherwise specified or otherwise apparent from the text, data sizes referred to herein are measured in bytes.) During the same period of time, Δt, a certain amount of data, S, can be transported over the interconnect. A portion of this data, L, comprises payload data, and a portion, S-L, comprises overhead. The methodologies disclosed herein concern the manner in which the client data is mapped into the payload portion of the interconnect data.

It is assumed that the interconnect utilizes a transport unit of some sort. This transport unit may be a packet, frame or other type of transport unit defined with respect to the interconnect and/or protocol utilized by the interconnect. In one embodiment, several of these transport units are handled together as a unit under operation. The purpose of handling multiple transport units as a single unit under operation is to increase the resolution of the frequency matching. In other words, if there are more bytes of data in the unit under operation, a single byte comprises a smaller percentage of the total space. Thus, if there are multiple transport units in a unit under operation, the ratio of client data to total data in the unit under operation can more closely match the ratio of data rates ($f_1/f_2$).

The unit under operation has an aggregate size, S. The aggregate size of the unit under operation is equal to the number of transport units, n, in the unit under operation, times the size of the transport unit, TU. The aggregate payload of the unit under operation is of size L, which is equal to the number of transport units, n, times the size of the payload, OPU, of an individual transport unit. Although the payloads of the transport units in the unit under operation are not actually contiguous, they will be treated as if they were for the purposes of determining how the client data will be distributed within the unit under operation.

Figure 1:
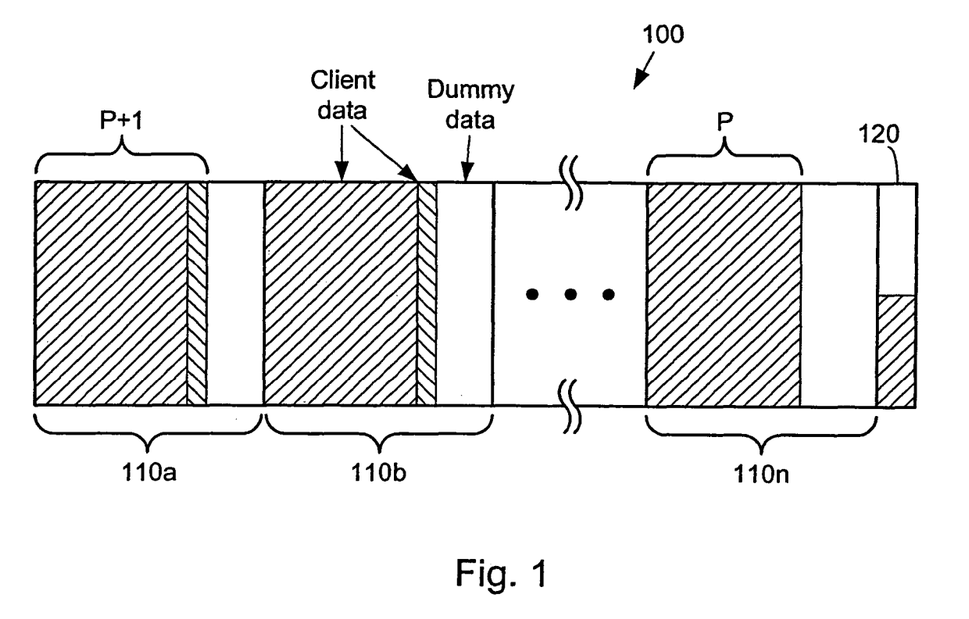
FIG. 1 is a diagram illustrating the aggregate payload of a unit under operation and the manner in which client data is distributed within the payload in accordance with one embodiment.

Referring to FIG. 1, a diagram illustrating the aggregate payload 100 of the unit under operation is shown. Payload 100 is conceptually broken down into multiple blocks 110. The number of blocks 110 in payload 100 is represented by K. Payload 100 may also include a residual slot 120. Payload 100 has a width, w, in bytes. In one embodiment, width w corresponds to the width of the interconnect itself. If width w is equal to a single byte, residual slot 120 is unnecessary, as will be explained in more detail below.

It should be noted that, for the purposes of this disclosure, identical items in the figures may be indicated by identical reference numerals followed by a lowercase letter, e.g., 110a, 110b, and so on. The items may be collectively referred to herein simply by the reference numeral.

Each block 110 has a capacity C, where C is equal to L divided by K, rounded down to the nearest integer. Residual slot 120 has a capacity J, where J is the remainder of L divided by K. K is preferably selected so that J is also the remainder of L divided by w. Thus, if w is equal to a single bite, there is no remainder, so J=0 (there is no residual slot 120).

It is desired to distribute the client data as evenly as possible among the K blocks 110 in payload 100. As noted above, the amount of client data to be mapped into the payload of the unit under operation has size N, in bytes. This data can be broken into two components. A first component, which will be mapped into blocks 110, comprises M w-bytes of data. M is equal to L divided by w, rounded down to the nearest integer. A w-byte is simply w bytes of data. The second component, comprising r bytes of data, will be mapped into residual slot 120. r is the remainder of L divided by w.

The client data is mapped into blocks 110 by first distributing P w-bytes of data to each of blocks 110, where P is equal to M divided by K, rounded down to the nearest integer. This leaves R w-bytes of data (apart from the r bytes of data to be mapped into residual slot 120). These R w-bytes of data are mapped, one to each block 110, until they are exhausted. Effectively, the M w-bytes of data are distributed to the blocks in round-robin fashion until they are all distributed. As a result, R of the K blocks 110 will contain P+1 w-bytes of data, while (K-R) of the K blocks 110 will contain P w-bytes of data, and residual slot 120 will contain r bytes of data.

As shown in FIG. 1 and described above, payload 100 of the unit under operation is only partially filled with client data. The portion of payload 100 that is not filled with client data is stuffed with dummy data. For example, the remainder of payload 100 may be filled with 0's.

FIG. 1 illustrates the pattern which will be used to transport the client data over the interconnect. The pattern is repeated with each unit under operation (which, in one embodiment, comprises a plurality of transport units). It should be noted that the methodology described above is only used to determine the pattern which will be used to transport the client data. In other words, the data itself is not actually distributed round-robin to the blocks of a unit under operation. Once the pattern is determined, P (or P+1) w-bytes of data are inserted in the first block, then the remaining space is stuffed with dummy data. The data (client data and dummy data) is formatted in the transport units and transported via the interconnect. The next block is then filled with data in the same manner and transported.

Figure 2:
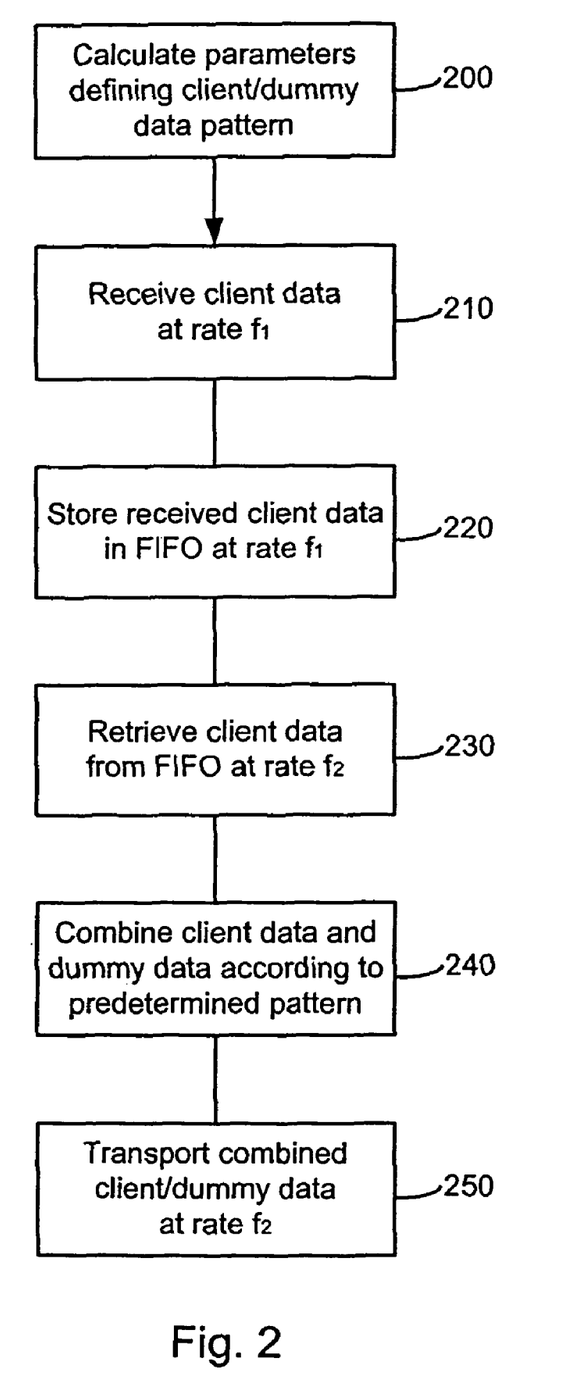
FIG. 2 is a flow diagram illustrating a method for receiving client data at a first rate and transporting the data at a second rate in accordance with one embodiment.

Referring to FIG. 2, a flow diagram illustrating a method in accordance with one embodiment is shown. In this embodiment, the method comprises calculating the parameters that define the pattern for packing the client data into the payload of the unit under operation (block 200), receiving the client data at the client data rate (block 210), buffering the data (block 220), retrieving the client data from the buffer (block 230), packing the data into the actual transport units according to the defined pattern (block 240) and transporting the data in the transport units at the interconnect data rate (block 250).

The method depicted in FIG. 2 is implemented at the transmitting end of the interconnect. A complementary method is normally implemented at the receiving end of the interconnect in order to unpack the client data and return it to the original client data rate. Such a method is illustrated in the flow diagram of FIG. 3. In this method, one or more parameters defining the pattern of the transported data are first received (block 300). Then, one or more transport units containing the client data are received (block 310). The client data is unpacked from the transport units according to the pattern (block 320) and the client data is stored in a buffer (block 330). The client data is then retrieved from the buffer at the client data rate (block 340) and forwarded to a recipient of the data (block 350).

Figure 3:
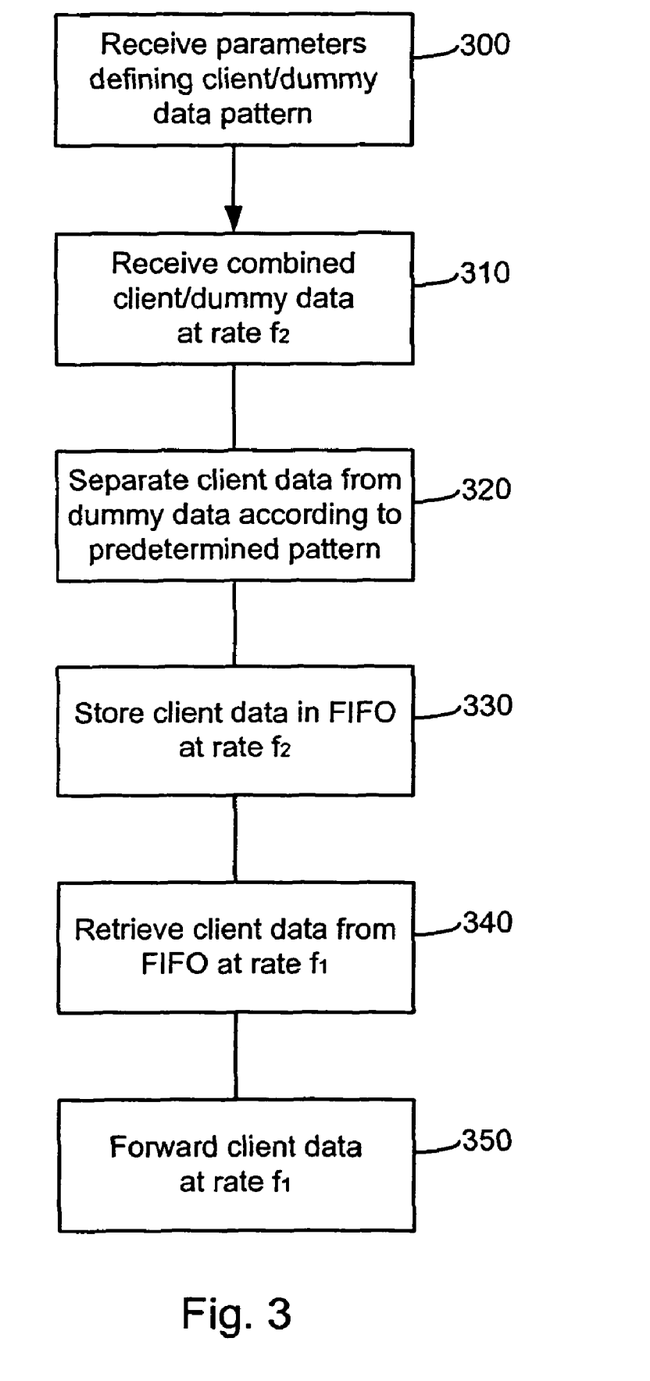
FIG. 3 is a flow diagram illustrating a method for receiving patterned client data at the second rate and producing the original client data stream at the first rate in accordance with one embodiment.

In addition to the embodiments depicted in FIGS. 2 and 3, one embodiment may comprise a method for determining the pattern of client data and dummy data within the payload of the unit under operation. In this method, the parameters defining the pattern are calculated based upon a number of known factors, including the client data rate, $f_1$, the interconnect data rate, $f_2$, the sizes of the transport unit used by the interconnect, TU, and its payload, OPU, and the number of transport units included in the unit under operation, n. The data rates, $f_1$, and $f_2$, are determined by the requirements of the implementation. The transport unit is defined by the interconnect. For example, if the interconnect is a G.709 optical transport medium, the transport unit will be a G.709 frame. The size of the frame and its payload or defined in the corresponding standards. The number of transport units included in the unit under operation can be selected by the system designer based upon the resolution considerations explained above. In one embodiment, the unit under operation includes eight transport units (G.709 frames).

Based upon the known factors identified above, the overall size of the unit under operation, S, the payload size of the unit under operation, L, and the amount of client data, N, to be mapped into the payload of the unit under operation can be determined as follows:

$S = n \times TU;$ $L = n \times OPU;$ $N = S \times (f_1/f_2).$

Then, the minimum amount of client data, P, to be placed in each block, as well as the number of blocks, R, that will have the maximum amount of client data (P+1) can be calculated as follows:

$P = M/K$, rounded down;

$R$ = remainder of $M/K$;

where M is the number of whole w-bytes of data in N and, as explained above, K is the number of blocks in the unit under operation. K is selectable by the system designer and may, for example, comprise eight blocks. Since w, the width of the interconnect, is also known, the number of bytes of data, r, that will be stored in the residual slot can also be computed:

$r$ = remainder of $N/w$

All or a portion of the parameter computation method described above, or other methods described herein, may be implemented in suitable software program code that may reside within ROM, RAM, hard disk drives or other computer-readable media within a computer system. An alternative embodiment of the invention comprises a computer system that is configured to operate in accordance with the present methods. Software program code may also be contained on a separable data storage device, such as a removable hard disk, or on removable computer-readable media such as a DASD array, magnetic tape, floppy diskette, optical storage device, or the like. Such storage devices or media containing the software program code comprise alternative embodiments of the invention.

Figure 4:
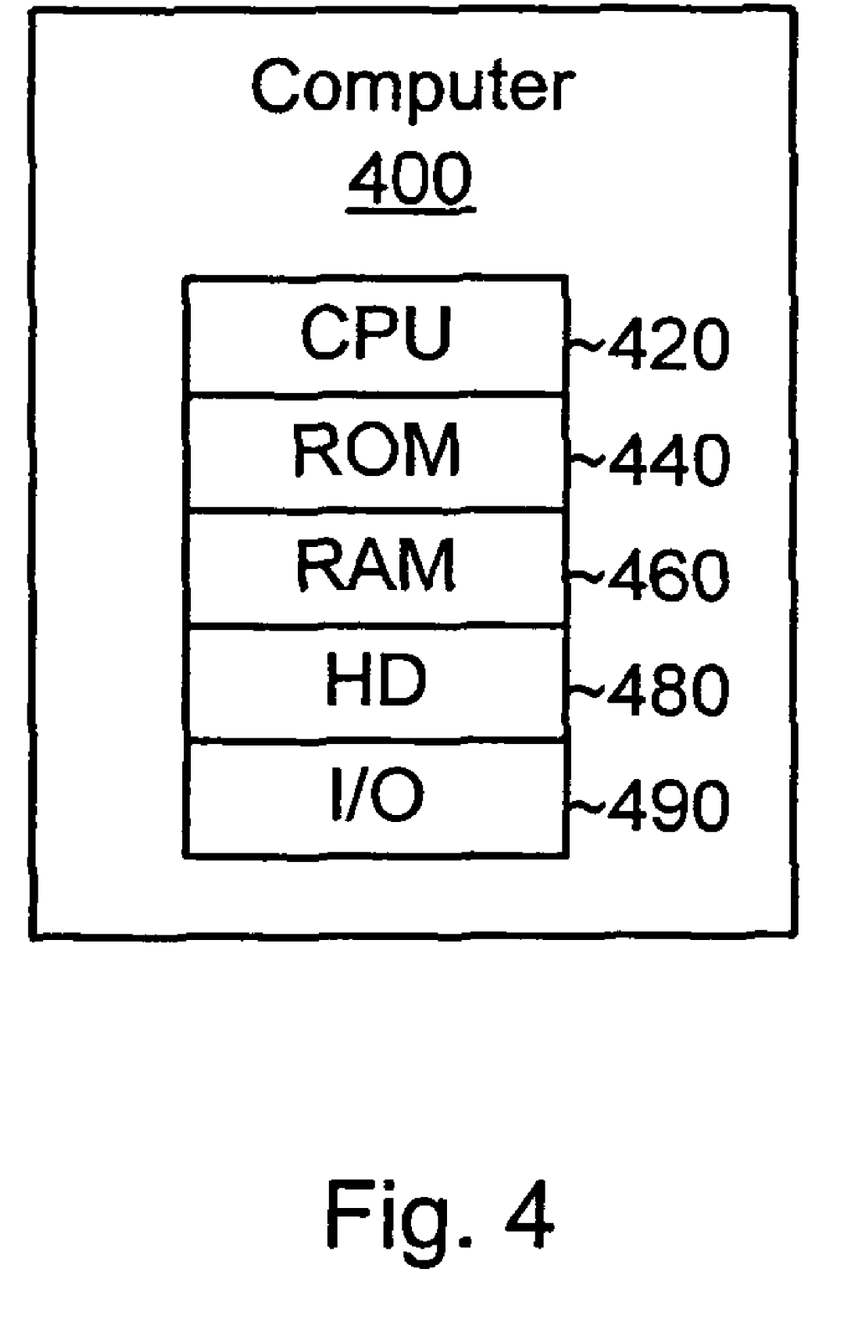
FIG. 4 is a diagram illustrating the components of an exemplary computer in which the present methods may be implemented.

Referring to FIG. 4, a diagram illustrating the components of an exemplary computer in which the present methods may be implemented is shown. The computer system illustrated in this figure may be used as a platform for the scrambler design program and/or the subsequently used Verilog program. As shown in FIG. 4, computer system 400 comprises a central processing unit ("CPU") 420, read-only memory ("ROM") 440, random access memory ("RAM") 460, hard disk drive ("HD") or storage memory 480, and input/output device(s) ("I/O") 490. I/O 490 can include a keyboard, monitor, printer, electronic pointing device (e.g., mouse, trackball, stylus, etc.), or the like.

The computer system may have more than one CPU, ROM, RAM, HD, I/O, or other hardware components. For simplicity, the computer illustrated in FIG. 4 is depicted in as having one of each of the listed hardware components. It should be noted that FIG. 4 is a simplification of an exemplary hardware configuration. Many other alternative hardware configurations are possible and known to persons of skill in the art.

"Computer" and "computer system," as used herein, are intended to include any type of data processing system capable of performing the functions described herein, including, for instance, a general purpose computer configured to calculate the parameters of the data pattern in a unit under operation, or a controller configured to implement the pattern for high-speed transport of the client data. "Computer-readable media," as used herein, refers to any medium that can store program instructions that can be executed by a computer, and includes RAM, ROM, floppy disks, hard disk drives, CD-ROMs, DVD-ROMs, DASD arrays, magnetic tapes, floppy diskettes, optical storage devices and the like.

Figure 5:
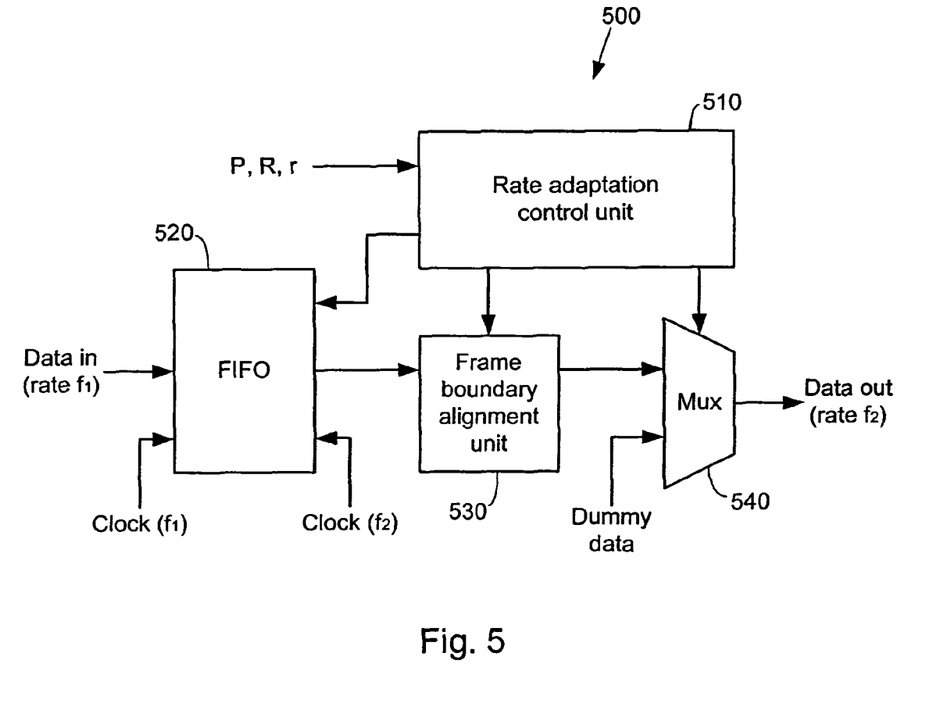
FIG. 5 is a functional block diagram of a system configured to receive client data at a first rate and transport the data at a second rate in accordance with one embodiment.

In addition to the method embodiments described above, an alternative embodiment may comprise a hardware system for transporting the client data. Referring to FIG. 5, a functional block diagram of a system in accordance with one embodiment is shown. In this embodiment, the system comprises a transmitting unit that is configured to receive the parameters defining the data pattern for the unit under operation, to format received client data accordingly, and to transmit this reformatted data over the interconnect.

System 500 is controlled by a rate adaptation control unit 510. Rate adaptation control unit 510 is coupled to a rate match FIFO 520 which receives client data at a first rate, $f_1$, and stores the data. A clock signal at rate $f_1$ is provided to rate match FIFO 520 for this purpose. A second clock signal at rate $f_2$ is also provided to rate match FIFO 520 for the purpose of reading data out of the FIFO. The data reads are controlled by input from rate adaptation control unit 510. The data which is read out of rate match FIFO is processed by frame boundary alignment unit 530, which is also controlled by rate adaptation control unit 510. The client data is then forwarded to multiplexer 540. Multiplexer 540 is controlled by rate adaptation control unit 510 to alternately select either the client data or dummy data, depending upon the predetermined pattern. The pattern is defined in this embodiment by input parameters P, R and r, which are precomputed and provided to rate adaptation control unit 510. The output of multiplexer 540 is then transported over the interconnect.

It should be noted that the various functions of system 500 may be redistributed in other embodiments. For example, rather than having separate components for rate adaptation control unit 510, frame boundary alignment unit 530 and multiplexer 540, the system may combine the respective functionalities into a single control unit. Alternatively, these functions may be redistributed into additional units that are not shown in FIG. 5. Many such variations of this and other hardware configurations disclosed herein are possible.

Figure 6:
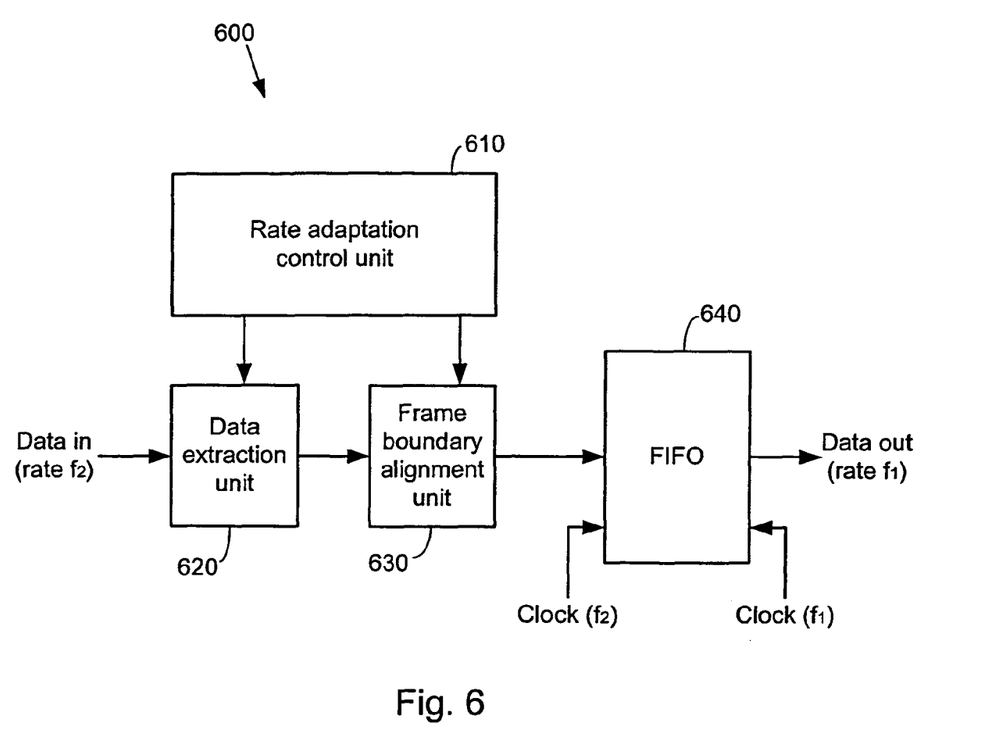
FIG. 6 is a functional block diagram of a system configured to receive patterned client data at the second rate and produce the original client data stream at the first rate in accordance with one embodiment.

Referring to FIG. 6, a functional block diagram of a system in accordance with an alternative embodiment is shown. In this embodiment, the system comprises a receiving unit that is configured to receive the patterned client/dummy data from system 500, to extract the client data and to output the original client data stream at the original client data rate, $f_1$.

System 600 is controlled by a second rate adaptation control unit 610. Rate adaptation control unit 610 is configured to receive the same input parameters (P, R, r) that were input to control unit 510 to define the pattern of client and dummy data. Rate adaptation control unit 610 is coupled to a data extraction unit 620 that is configured to function essentially as a demultiplexer. Data extraction unit 620 forwards client data to frame boundary alignment unit 630, which passes the data to rate match FIFO 640. Rate adaptation control unit 610 controls units 620, 630 and 640 to cause the client data (but not the dummy data) to be written into rate match FIFO 640. The data is written into rate match FIFO 640 at rate $f_2$ based upon a corresponding clock signal that is input to the FIFO. The client data is then read out of rate match FIFO 640 based upon a second clock signal at the original client data rate, $f_1$.

It should be noted that yet another embodiment may comprise a system that includes a transmitting subsystem such as system 500, a receiving subsystem such as system 600, the interconnect between them, and a computer configured to compute the pattern-defining parameters P, R, and r, and to provide these parameters to the transmitting and receiving subsystems. The specific configuration of this system, as well as the configurations of the individual transmitting and receiving systems described above, are intended to be exemplary, and may vary in other embodiments.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A non-transitory computer-readable medium containing instructions configured to cause a computer connected to a transmitting unit to execute a method to produce a pattern for combining client data input to the transmitting unit with dummy data for transport at a rate higher than a rate at which client data is input, the method comprising the computer-executed steps of:
   identifying a first rate at which the client data is received by the transmitting unit;
   identifying a second rate at which combined client data and dummy data is transported from the transmitting unit;
   identifying a size of a payload of a unit under operation;
   identifying an amount of client data to be mapped into the payload of the unit under operation;
   selecting a number of blocks of the payload of the unit under operation into which client data will be distributed;
   computing a pattern for client data in the payload of the unit under operation, wherein the pattern comprises a first number of the blocks containing a first amount of client data, a second number of the blocks containing a second amount of client data and a residual slot containing a residual amount of client data, and wherein the pattern further comprises dummy data in portions of the blocks and residual slot that are not filled with client data; and
   providing a plurality of output parameters to the transmitting unit defining the pattern.

2. The non-transitory computer-readable medium of claim 1, the pattern including K successive blocks, wherein a number, R, of the K blocks contain a first amount of client data, wherein a second number, K-R, of the K blocks contain a second amount of client data.

3. The non-transitory computer-readable medium of claim 2, wherein the step of identifying a size of a payload includes determining a payload size, L, of a unit under operation and an amount of client data, N, to be mapped into the payload of the unit under operation, the method further including the computer-executed steps of:
   determining a number of full w-bytes of client data in N, where w is the width of a transport medium over which the combined data is transmitted;
   determining the first amount of client data, P, and the second amount of client data, P+1, where P is M divided by K, rounded down;
   determining the first number, R, and second number, K-R of blocks, where R is the remainder of M divided by K; and
   if N is not evenly divisible by w, determining a residual amount of client data, r, where r is equal to the remainder of N divided by w, wherein the pattern further comprises a residual slot containing r bytes of client data.

4. The non-transitory computer-readable medium of claim 3, wherein the residual slot contains a residual amount of client data that is less than the first amount of data.

5. The non-transitory computer-readable medium of claim 4, wherein the residual amount of client data is less than w bytes of data, where w is the data width of a transport medium over which the combined data is transported.

6. The non-transitory computer-readable medium of claim 5, wherein the plurality of output parameters comprises P, R, and r.

7. The non-transitory computer-readable medium of claim 6, wherein the transmitting unit is configured to combine the client and dummy data according to the pattern in response to the output parameters P, R, and r, and the computer-executed step of providing a plurality of output parameters includes providing P, R, and r to the transmitting unit.

8. The non-transitory computer-readable medium of claim 6, the computer further connected to a receiving unit configured to receive the pattern and to extract the client data at the first rate in response to the output parameters P, R, and r, the method further comprising the computer-executed step of providing P, R, and r to the receiving unit.

9. The non-transitory computer-readable medium of claim 2, wherein each of the K blocks has a capacity C, wherein a portion of each block that does not contain client data is stuffed with the dummy data.

10. The non-transitory computer-readable medium of claim 9, wherein the dummy data comprises 0's.

11. The non-transitory computer-readable medium of claim 2, the method further comprising the computer-executed step of providing the output parameters to a transmitter configured to combine the client and dummy data according to the pattern and to a receiver which is configured to receive the combined client and dummy data and separate the client data from the dummy data according to the pattern.

12. The non-transitory computer-readable medium of claim 2, wherein the output parameters comprise a minimum amount of client data contained in each block, a number of blocks that contain more than the minimum amount of client data, and a residual amount of client data contained in a residual slot.

13. The non-transitory computer-readable medium of claim 12, the computer further connected to a receiving unit configured to receive the pattern and to extract the client data at the first rate in response to the output parameters, the method further comprising the computer-executed step of providing the output parameters to the receiving unit.

14. The non-transitory computer-readable medium of claim 2, the computer further connected to a receiving unit configured to receive the pattern and to extract the client data at the first rate in response to the output parameters, the method further comprising the computer-executed step of providing the output parameters to the receiving unit.

15. The non-transitory computer-readable medium of claim 1, the computer further connected to a receiving unit configured to receive the pattern and to extract the client data at the first rate in response to the output parameters, the method further comprising the computer-executed step of providing the output parameters to the receiving unit.

16. A method for computing a pattern for combining client data and dummy data for transport at a rate higher than the rate at which client data is received, comprising:

identifying a first rate at which client data is received;

identifying a second rate at which combined client data and dummy data is transported;

identifying a size of a payload of a unit under operation;

identifying an amount of client data to be mapped into the payload of the unit under operation;

selecting a number of blocks of the payload of the unit under operation into which client data will be distributed;

computing a pattern for client data in the payload of the unit under operation, wherein the pattern comprises a first number of the blocks containing a first amount of client data, a second number of the blocks containing a second amount of client data and a residual slot containing a residual amount of client data, and wherein the pattern further comprises dummy data in portions of the blocks and residual slot that are not filled with client data; and using a transmitting unit for receiving a plurality of output parameters defining the pattern.

* * * * *